United States Patent [19]

Benson et al.

[11] Patent Number: 4,829,210
[45] Date of Patent: May 9, 1989

[54] MULTIFUNCTIONAL STRUCTURAL MEMBER AND REFLECTOR LAMP EMPLOYING SAME

[75] Inventors: Timothy A. Benson, Winchester; Peter R. Gagnon, Georgetown, both of Mass.

[73] Assignee: GTE Products Corporation, Danvers, Mass.

[21] Appl. No.: 6,182

[22] Filed: Jan. 23, 1987

[51] Int. Cl.$^4$ ............................ H01J 5/12; H01J 5/56; H01K 1/42
[52] U.S. Cl. ..................................... 313/25; 313/113; 313/318
[58] Field of Search ................. 313/25, 113, 271, 318, 313/315, 333, 578, 579

[56] References Cited

U.S. PATENT DOCUMENTS

| | | | |
|---|---|---|---|
| 3,904,904 | 9/1975 | Meinecke et al. | 313/113 |
| 4,634,920 | 1/1987 | Rijckaert et al. | 313/113 X |
| 4,663,558 | 5/1987 | Endo | 313/113 X |

Primary Examiner—Kenneth Wieder
Attorney, Agent, or Firm—Joseph S. Romanow

[57] ABSTRACT

A multifunctional member and reflector lamp employing same for mounting a light-source capsule on the inside of the neck of the outer envelope, for optically aligning the capsule with respect to the reflector, for reflecting heat away from the base region of the lamp, for blocking convective heat transfer into the lamp neck, and for reflecting light incident on the member toward the lens. In performing these multiple functions, the member reflects heat back to the filament or light source which improves its efficiency, and the member redirects light toward the lens which improves the efficacy of the lamp. In a preferred embodiment, the multifunctional member is formed from stainless steel and has a bowl-shaped body with a somewhat flexible peripheral annular tab extending upward and outward conically. The peripheral tab may be crimped, slotted, or have a tapered thickness in order to provide flexibility sufficient for mounting. The bowl-shaped body preferably is paraboloidal having a focal center substantially coincident with the focal center of the reflector. In an alternate embodiment, the multifunctional member has a curvature matched to the curvature of the reflector and no peripheral tab so that the reflector has been optically extended to the press seal of the light-source capsule. A lamp constructed in accordance with the invention is particularly well suited for employing a heat-sensitive component, such as a diode, in the base region of the lamp.

22 Claims, 2 Drawing Sheets

MULTIFUNCTIONAL STRUCTURAL MEMBER AND REFLECTOR LAMP EMPLOYING SAME

TECHNICAL FIELD

The invention herein relates to a multifunctional member and a reflector lamp employing same. More particularly, the invention relates to a reflector lamp having a multifunctional structural member which in addition to supporting the light-source capsule acts as a heat shield, light reflector, and alignment device.

BACKGROUND ART

In a reflector lamp, heat from the light-source capsule may be detrimental to components in the base of the lamp, especially when the lamp is operated in the base-up position. The smaller the size of the lamp, the more severe is the heat problem. When the lamp is burned in an enclosing fixture, the heat problem may be even more severe because heat may be trapped within the fixture thus increasing the temperature of the internal lamp components. As a general principle in lamp design, the more ehat reflected back to the light source, the more efficiently the light source will operate.

In incandescent lamps, heat shields have been employed to reduce base temperature. In this regard, refer to U.S. Pat. No. 4,480,212, to Monahan et al., wherein a heat-reflecting and light-reflecting shield is employed in a single-enveloped A-line incandescent lamp between the filament and lamb base. See also U.S. Pat. Nos. 1,425,967, to Hoffman; 3,209,188, to Freeman; and 4,160,929, to Florington et al.

U.S. Pat. No. 4,494,176, to Sands et al., discloses a light-reflecting parabolic reflector section mounted behind the filament in a single-enveloped incandescent parabolic reflector lamp. The section extends the light-reflecting surface of the parabolic reflector into the region behind the filament, thereby improving the optical efficacy of the lamp.

In projection lamps, it is known to employ a retention member mounted in the neck of the lamp for supporting and aligning a light-source capsule within the reflector. See U.S. Pat. Nos. 4,156,901 and 4,219,870, both to Haraden et al., and 4,403,276, to Blaisdell.

Thus, it is seen that the mounting, aligning, optically reflecting, and heat-reflecting functions are present in various types of reflector lamps, and that one or two of these functions may be performed by a mounting device for the light-source. It would be an advancement of the art if a simple and inexpensive lamp member were provided for a reflector lamp which ably performs all of these functions. Such a multifunctional member would enable improved performance, particularly in smaller sized lamps where space is an important factor, with no increase in cost.

DISCLOSURE OF THE INVENTION

It is, therefore, an object of the invention to avoid the deficiencies of the prior art.

Another object of the invention is to provide a combination mounting, aligning, heat-reflecting, convection blocking, and light-reflecting member for a reflector lamp.

Still another object of the invention is to provide a simple and inexpensive multifunctional member for a reflector lamp which will substantially improve lamp performance, particularly in smaller lamps where space is limited.

Yet another object of the invention is to provide a multifunctional member for a reflector lamp which will shield heat from the base region of the lamp such that one or more heat-sensitive components may be safely located within the base region of the lamp.

These objects are accomplished, in one aspect of the invention, by the provision of a reflector lamp comprising an outer envelope enclosing an interior. The outer envelope includes a reflector and light-transmissive lens. The reflector has an aperture in it. The outer envelope includes a neck joining the reflector about the perimeter of the aperture. A light-source capsule is positioned within the aperture and optically aligned with respect to the reflector.

A multifunctional member is mounted on the neck within the outer envelope. The multifunctional member provides means for supporting the light-source capsule, means for optically aligning the light-source capsule with respect to the reflector, means for reflecting infrared energy away from the neck, means for blocking convective heat transfer to the lamp neck, and means for reflecting light incident on the member toward the lamp lens.

There are means passing through the lamp neck for providing electrical power to the light-source capsule.

In another aspect of the invention, the multifunctional member, as disclosed above, is claimed separately from the reflector lamp.

A reflector lamp having a multifunctional member in accordance with the invention will exhibit improved operating characteristics with little additional manufacturing costs.

BEST MODE FOR CARRYING OUT THE INVENTION

For a better understanding of the invention, together with other and further objects, advantages, features, and capabilities thereof, reference is made to the following disclosure and appended claims taken in conjunction with the above-described drawings.

As used herein, the term "light-source capsule" includes a tungsten-halogen capsule, a metal halide arc tube or capsule, a high-pressure sodium ceramic arc tube or capsule, and any other light-emitting capsule or arc tube mounted within an outer envelope of a lamp.

The term "multifunctional member," as employed herein, denotes a structural component for a reflector lamp which performs the following functions: supports the light-source capsule, assists in optically aligning the light-source capsule with respect to the reflector, reflects infrared energy away from the lamp neck, blocks or prevents heat transfer from the light-source capsule to the lamp neck by convection currents, and reflects light incident on the member toward the lamp lens.

Figure 1:
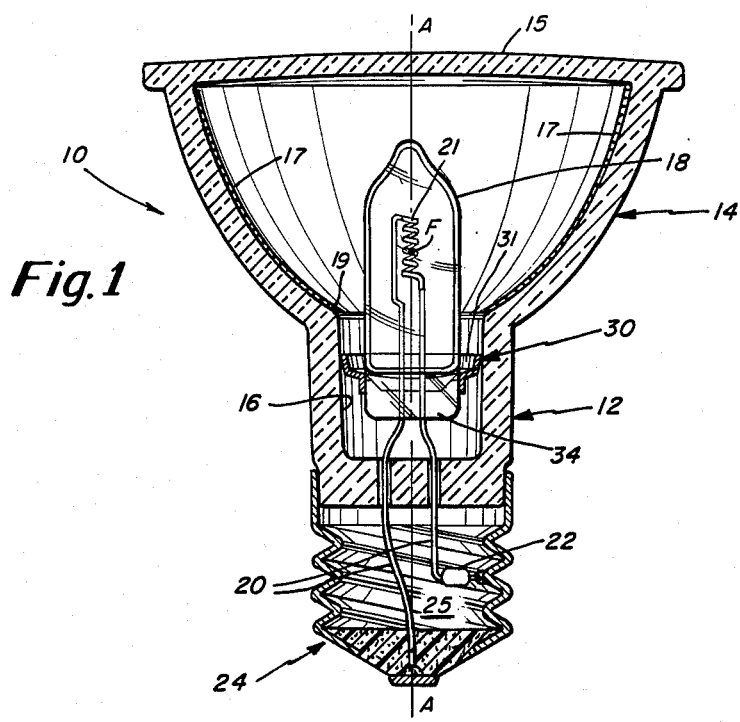
FIG. 1 is a cross-sectional view of an embodiment of the invention illustrating a parabolic aluminized reflector (PAR) lamp, particularly a PAR 20 lamp, having a multifunctional member mounted on and within the lamp neck. A flexible peripheral tab on the member is pressure mounted against the inner wall of the neck.

FIG. 1 shows a PAR 20 lamp 10 comprising an outer envelope enclosing an interior. The outer envelope includes reflector 14 and light-transmissive lens 15. As used herein, reflector 14 includes a light-reflecting coating 17, such as aluminum, on the interior surface thereof. Alternately, light-reflective coating 17 may be a dichroic-type coating, which reflects visible light and transmits infrared energy through reflector 14. Reflector 14 has an aperture formed in it. Neck 12 joins reflector 14 about perimeter or brim 19 of the aperture. The inner surfaces of reflector 14 and neck 12 meet at brim 19. Preferably, coating 17 extends over brim 19 and inner wall 16 of neck 12. As will be noted below, an aluminized coating may assist in conducting heat away from the lamp neck and base region. In the embodiment of FIG. 1, the interior of neck 12 is shown as being cylindrical. Neck 12 may be tapered, shouldered, grooved, or otherwise shaped in other embodiments.

Light-source capsule 18, e.g., a tungsten-halogen capsule, is mounted on multifunctional member 30 on the interior of neck 12. Capsule 18 has press seal 34 at the base thereof which fits snugly into a receiving slot in member 30, as will be shown in greater detail below. Member 30 may be formed of a relatively stiff metal, such as stainless steel, aluminum, etc., or it may be formed from a non-metallic material, e.g., a ceramic, capable of withstanding the elevated temperature surrounding capsule 18. In the embodiment of FIG. 1, member 30 is formed from stiff metal with flexible annular tab 31 extending upward, i.e., toward lens 15, and outward conically from the body of the tab. Member 30 is mounted on neck 12 by tab 31 pressing firmly against inner wall 16 of neck 12. As shown in the drawing, member 30 may be mounted at an appropriate distance below brim 19 within neck 12. An appropriate distance is determined by optically aligning capsule 18 such that the light source, e.g., coil 21, is substantially centered with respect to central axis A-A and focal center F of reflector 14. Tab 31 is somewhat flexible to permit member 30 with capsule 18 mounted thereon to be positioned and aligned, yet sufficiently stiff and inflexible so that the capsule assembly will remain properly aligned during shipping and use.

As shown in FIG. 1, base 24, e.g., an Edison-type base, is mounted on neck 12. Electrical lead-in wires 20 of capsule 18 pass through neck 12 into base region 25 wherein temperature-sensitive component 22, e.g., a diode, may be located. Lead-in wires 20 are coupled, through diode 22 on one lead-in, with the two poles of base 24, whereby means are provided for supplying capsule 18 with electrical power from an external source.

Multifunctional member 30 has means for shielding base region 25 from radiational and convective heat transfer from capsule 18 and means for reflecting light from capsule 18 toward lens 15. Member 30 has a polished surface or coating, e.g., an aluminun coating, on it facing lens 15 such that both infrared energy and light are reflected away from neck 12. Member 30 is adapted to be sufficiently snug and airtight about brim 19 and press seal 34 so that convective heat transfer from caspule 18 into neck 12 below member 30 is effectively blocked. Preferably, infrared energy radiating from capsule 18 should be redirected to the light source, e.g., filament 21, so that the light source or filament will burn more efficiently due to the diminished electrical power required to heat the filament; and light emanating from capsule 18 onto member 30 should be reflected, directly or indirectly, through lens 15 so that the efficacy of lamp 10 will be improved. In embodiments wherein member 30 is formed from metal and an aluminized coating 17 is in contact with member 30, the metal member tends to conduct heat radially away from capsule 18 to coating 17 whereupon it is transferred to the body of reflector 14. This further assists in maintaining cooler temperatures in the base region of lamp 10 and in the press seal of capsule 18. The reduced press seal temperature may have a beneficial effect on lamp life. The foregoing objectives may be substantially realized by forming the body of member 30 into a bowl shape, preferably a paraboloid having a focal center coincident, or nearly so, with the focal center of the reflector.

Figure 2:
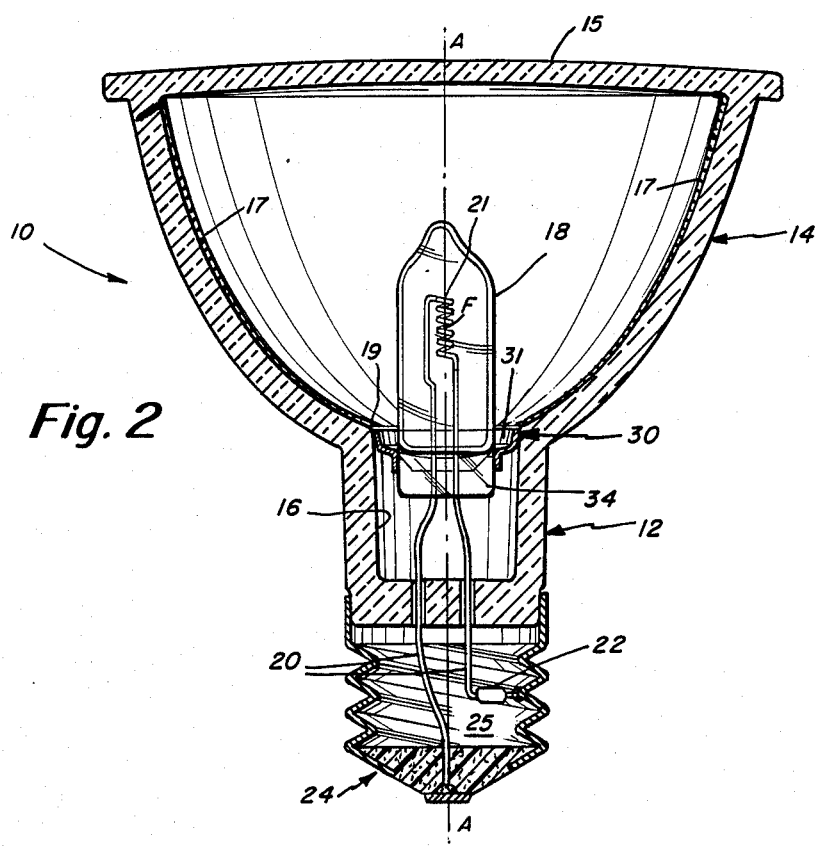
FIG. 2 is a cross-sectional view of another embodiment of the invention, particularly a PAR 30 lamp, in which a multifunctional member is mounted on the lamp neck along the brim where the neck joins the reflector within the outer envelope. A flexible peripheral tab of the member is pressure mounted against the inner wall of the neck adjacent to the brim.
Figure 7:
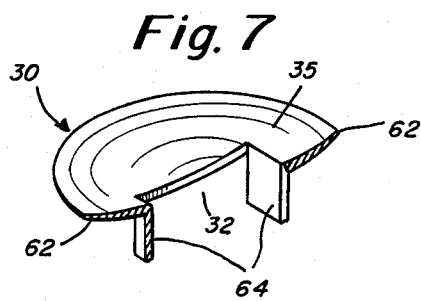
FIG. 7 illustrates another embodiment of a multifunctional member in accordance with the invention. The cross-sectional view shows a member having a parabolic-shaped body and no peripheral tab. The body has a tapered thickness, being thinnest at its outer edge, in order to provide flexibility for mounting and aligning the light-source capsule.

FIG. 2 shows a PAR 30 lamp in an alternate embodiment of the invention. The same reference characters are used in FIG. 2 to identify lamp components corresponding to those of FIG. 1. In the embodiment of FIG. 2, focal center F of reflector 14 is positioned such that multifunctional member 30 is mounted near brim 19. Ideally, the shape of member 30 should be an optical extension of the shape of reflector 14, which in this embodiment is paraboloidal, in which case the curvatures of the multifunctional member and reflector are matched. In the embodiment of member 30 of FIG. 2, the slope (near vertical) of peripheral tab 31 is approximately equal to that of inner wall 16 of neck 12. This slope provides a very rigid mount of member 30 in neck 12 and is preferred for that reason. The presence of tab 31, however, prevents the ideal optical extension of reflector 14 by member 30. With an alternate embodiment of the multifunctional member, such as is shown in FIG. 7 wherein the member does not have a peripheral tab, or in FIG. 8 wherein the peripheral tab extends below the body of the member, an ideal optical extension of the reflector by the multifunctional member may be substantially achieved by matching the curvatures of the body of the member and the reflector.

FIGS. 3-8 show various embodiments of multifunctional member 30 which may be employed in lamp 10 and other reflector lamps in accordance with the invention. In FIGS. 3-8, the same reference characters are employed to identify corresponding lamp components; and to the extent lamp parts of FIGS. 3-8 are also identified in FIGS. 1 and 2, the reference characters of FIGS. 3-8 are the same as those of FIGS. 1 and 2.

Figure 3:
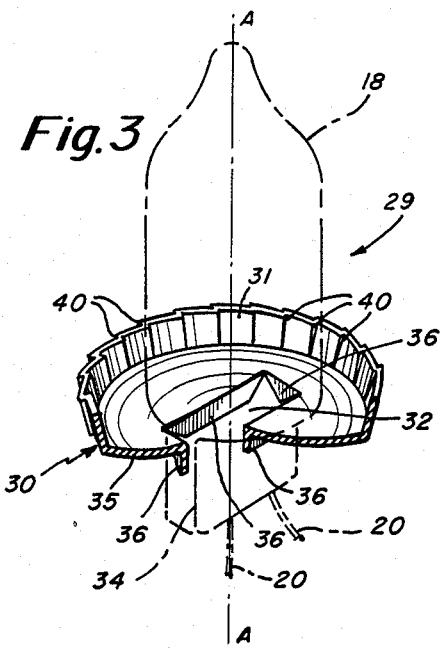
FIG. 3 shows one embodiment of a multifunctional member in accordance with the invention. The member has an edge-crimped tab for flexibility in mounting and aligning the light-source capsule (shown in a dashed line). In the view, the member is partially cut away in order to show its bowl-shaped body and crimped tab. The light-source capsule snugly mounts into a receiving slot with pressure tabs in the center of the member.

Referring now to FIG. 3, light-source capsule 18 in its mounted position on multifunctional member 30 is outlined in dashed lines forming capsule assembly 29. Circular member 30 comprises bowl-shaped body 35, e.g., a paraboloid having a focal center at a desired point on axis A—A, and a peripheral tab 31 extending upward, i.e., toward the top of capsule 18, and outward, i.e., away from the body of capsule 18, in a frusto-conical shape. Tab 31 is formed with a plurality of crimps 40. Body 35 has slot 32 centrally formed therein for receiving press seal 34 of capsule 18. Slot 32 has tabs 36 (in this embodiment there are four tabs associated therewith) extending substantially parallel to the walls of press seal 34.

Capsule 18 is mounted on member 30 by inserting press seal 34 into slot 32, preferably until the bulbous portion of the capsule is flush against the body of member 30. Slot 32 is sized to that press seal 34 fits snugly into it. Tabs 36 are formed so that each tab presses firmly against the respective wall of press seal 34. In this way, capsule assembly 29 is constructed with a rigid and nearly airtight fit between capsule 18 and member 30. Tabs 36, although not required, are preferred particularly for keeping capsule 18 rigidly aligned with respect to central axis A—A. When mounted in a reflector lamp, such as lamp 10, axis A—A of capsule assembly 29 will be aligned with the central axis of the reflector lamp.

Capsule assembly 29 may be mounted on neck 12 of lamp 10 as shown in FIGS. 1 and 2. In FIG. 1, multifunctional member 30 is disposed at an appropriate distance below brim 19; in FIG. 2, member 30 is mounted on or near brim 19. In both embodiments, the position of capsule 18 and filament 21 is determined by the optical requirement of centering filament 21 (or the light source) with respect to axis A—A and focal center F of reflector 14.

During lamp assembly, capsule assembly 29 is inserted into neck 12. Member 30 is sized such that inner wall 16 will compress flexible tab 31 toward capsule 18 when capsule assembly 29 is inserted into neck 12. As shown in FIG. 3, tab 31 may have crimps 40 formed in it to permit the bending of the tab. On the other hand, the thickness of member 30 and tab 31, shown in cross section in the drawing, should be such that the tab presses against wall 16 with sufficient force to hold the capsule assembly rigidly in place and aligned during the lift of the lamp. In a preferred embodiment, member 30 is formed from stainless steel having a thickness of approximately 0.002 to 0.004 inches. The thickness of member 30 depends on the type of material chosen for the member. The jagged external edges of crimps 40 assist in gripping inner wall 16 to form a permanent mount. In other embodiments, inner wall 16 may be tapered, growing more narrow as the wall approaches the base. This taper has the advantage that the mount of the multifunctional member grows tighter as the member is inserted deeper into the neck, so that a rigid mount is assured.

Figure 4:
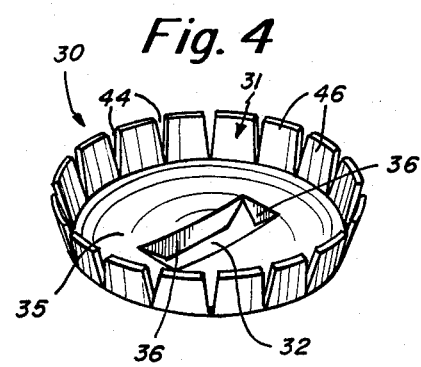
FIG. 4 shows an alternate embodiment of a multifunctional member in accordance with the invention. The peripheral tab has radial slots defining plural fingers which provide flexibility in the tab for mounting and aligning the light-source capsule.

FIG. 4 shows an alternate embodiment of member 30 wherein peripheral tab 31 has radial slots 44 formed or cut therein to define a plurality of radial fingers 46. The fingers provide flexibility in the marginal tab sufficient for mounting in neck 12. Body 35 may be bowl-shaped with slot 32 and tabs 36, as in the embodiment of FIG. 3.

Figure 5:
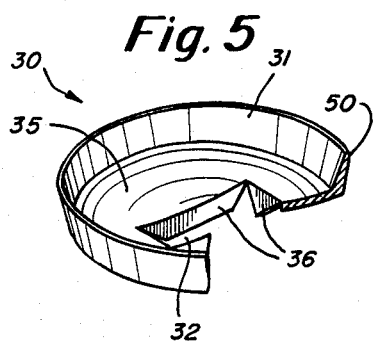
FIG. 5 illustrates yet another embodiment of a multifunctional member in accordance with the invention in a partially cutaway view. The peripheral tab, shown in cross section, is tapered, being thinnest at the outermost edge of the tab in order to provide flexibility for mounting and aligning the light-source capsule.

FIG. 5 shows another embodiment of member 30 wherein tab 31 is neither crimped nor slotted; the thickness of the tab is tapered being thinnest at edge 50, as shown in the cross-sectional view of tab 31 in the drawing. The taper provides flexibility to the tab sufficient for mounting in neck 12. Body 35 may be bowl-shaped with slot 32 and tabs 36, as in the embodiments of FIGS. 3 and 4.

Figure 6:
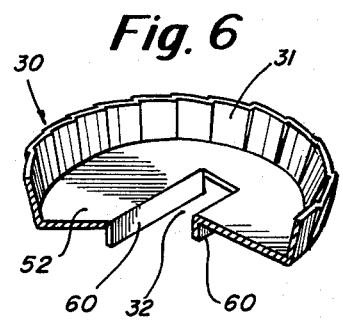
FIG. 6 illustrates still another embodiment of a multifunctional member in accordance with the invention in a partialy cutaway view. In this embodiment, the member has a flat disk-shaped body with a crimped peripheral tab.

FIG. 6 shows still another embodiment of member 30 having a crimped peripheral tab 31. In this embodiment, body 52 of member 30 is flat. Surface 52 may be polished or have a coating on it so that it is reflective of both infrared energy and visible light. Slot 32 has two pressure tabs 60 on the longer sides of the rectangular slot, rather than the four tabs of the embodiments of FIGS. 3-5.

FIG. 7 shows yet another embodiment of member 30 wherein member 30 does not have a peripheral tab. Body 35 has a tapered thickness being thinnest at outer edge 62, as shown in the cross-sectional view of the body in the drawing. The taper provides flexibility in the body sufficient for mounting in neck 12. In this embodiment, body 35 is bowl-shaped, preferably being a paraboloid whose curvature is matched to the curvature of the lamp reflector. As commented on above, this embodiment has the advantage that member 30 may extend the curvature of the reflector up to the press seal of the light-source capsule (because of the absence of the peripheral tab). In this optical sense, member 30 is ideal. Slot 32 is rectangular with, for example, two tabs 64 on the shorter sides of the slot.

Figure 8:
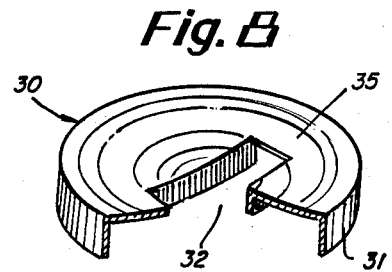
FIG. 8 illustrates yet another embodiment of a multifunctional member in accordance with the invention. In this view, the member is partially cut away to illustrate the bowl-shaped body and peripheral tab extending downward and outward conically from the periphery of the body.

FIG. 8 shows another embodiment of a multifunctional member 30 well adapted to extending the curvature of the reflector. In this embodiment, tab 31 extends downward so that the periphery of body 35, when mounted, abuts the brim of the reflector. When the curvature of body 35 is matched to that of the reflector, the light-reflecting surface is extended to the press seal of the capsule. Tab 31, which extends downward, i.e., toward the lamp base, provides means for obtaining a rigid mount in the same manner as described in relation to other embodiments above. The tab may include crimps, slots, a tapered thickness, etc. Because the downward tab is below the reflecting surface, the reflecting surface of the multifunctional member is not offset from the lamp reflector as is the case with the upward tab of FIG. 2.

In accordance with the invention, a multifunctional member for a reflector lamp has been described. Several embodiments of the multifunctional member have been illustrated, but these examples are by no means exhaustive. The multifunctional member is particularly well suited for a reflector lamp employing a light-source capsule. A capsule has significantly more size and mass than a filament alone. Therefore, the capsule requires more support to provide precision in alignment. The multifunctional member is also particularly well suited to a lamp having a heat-sensitive component located in the base region of the lamp. The multifunctional member is adapted for shielding the base region from heat so that operation of the component will be unimpaired. Also, the basing cement, solder, epoxy, etc., in the base region are protected from excessive heat. In performing its functions of reflecting heat and light away from the base region, the light source burns more efficiently and the luminous efficacy of the lamp is improved.

A multifunctional member in accordance with the invention facilitates lamp construction. The light-source capsule is mounted on the multifunctional member by mechanical means. The capsule assembly is mounted and aligned on the inside of the lamp neck by mechanical means. After completion of the electrical circuit and mounting of the base and lens by standard techniques, the resulting is a shock-resistant structure adequate for a commercial product.

For results in laboratory examples of reflector lamps having a multifunctional member in accordance with the invention, reference is made to the following Tables I and II corresponding to the PAR 20 and PAR 30 lamps shown in FIGS. 1 and 2, respectively.

TABLE I

| | | PAR 20 | | |
|---|---|---|---|---|
| Capsule Wattage | Diode wo/Member | Diode w/Member | Base wo/Member | Base w/Member |
| 35 W | 207° C. | 183° C. | 145° C. | 125° C. |
| 50 W | 250° C. | 224° C. | 179° C. | 165° C. |
| 60 W | 280° C. | 246° C. | 199° C. | 184° C. |

TABLE II

| | | PAR 30 | | |
|---|---|---|---|---|
| Capsule Wattage | Diode wo/Member | Diode w/Member | Base wo/Member | Base w/Member |
| 50 W | 180° C. | 161° C. | 131° C. | 114° C. |
| 60 W | 195° C. | 179° C. | 142° C. | 134° C. |
| 72 W | 212° C. | 192° C. | 155° C. | 144° C. |

The temperature data of Tables I and II were measured using K-type thermocouples bonded to lamp components with epoxy. All lamps were operated at 120 volts of alternating current in tightly enclosing fixtures in the vertical base-up position. The lamps were operated for at least two hours prior to recording temperatures so that steady state conditions were obtained. The ambient temperature about the exterior of the fixtures was 24° C.

The data of both Tables demonstrate that the steady state operating temperatures of the base and within the base region, i.e., about the diode within the base region, are substantially reduced in lamps having a multifunctional member in accordance with the invention than in comparable lamps without the multifunctional member. Each table has five columns. The first column contains the wattage of the light-source capsule. The second and fourth columns contain the observed temperatures in prior art lamps wherein the light-source capsules were supported in an open lamp neck by means of the lead-in wires. The third and fifth columns contain the observed temperatures for lamps having a multifunctional member in accordance with the invention.

As may be seen from Tables I and II, the steady state temperatures in lamps in accordance with the invention are significantly reduced, more so in the smaller PAR 20 lamp. A temperature difference of 10° C. is considered to be significant in view of temperature tolerances of lamp components such as diodes, basing cement, solder, etc.

While there have been shown and described what are at present considered to be the preferred embodiments of the invention, it will be apparent to those skilled in the art that various changes and modifications can be made herein without departing from the scope of the invention as defined by the appended claims.

What is claimed is:

1. A reflector lamp comprising:
   (a) an outer envelope enclosing an interior, said outer envelope including a reflector and light-transmissive lens, said reflector having an aperture therein, said outer envelope including a neck joining said reflector about the perimeter of said aperture;
   (b) a light-source capsule positioned within said aperture and optically aligned with said reflector;
   (c) a multifunctional member mounted on said neck within said outer envelope, said member providing means for supporting said light-source capsule, means for optically aligning said light-source capsule with respect to said reflector, means for reflecting infrared energy away from said neck, means for blocking convective heat transfer to said neck, and means for reflecting light incident on said member toward said lens, said multifunctional member having a bowl-shaped body with a flexible annular tab extending toward conically from the periphery of said body, said bowl-shaped body having a substantially concave shape with respect to said light-source capsule with the focal center of said bowl-shaped body being substantially coincident with the focal center of said reflector, the curvature of said bowl-shaped body being matched with the curvature of said reflector; and
   (d) means passing through said neck for providing electrical power to said light-source capsule.

2. A reflector lamp as described in claim 1 wherein said annular tab has a tapered thickness being thinnest at the outer edge of said tab.

3. A reflector lamp as described in claim 1 wherein said light-source capsule has a press seal at an end thereof and said multifunctional member has a slot formed therein for receiving and securely mounting said light-source capsule on said member.

4. A reflector lamp as described in claim 3 wherein said slot has second tab means associated therewith for engaging said press seal of said light-source capsule.

5. A reflector lamp as described in claim 1 wherein said multifunctional member is formed from metal and the surface of said member facing the interior of said reflector is optically and thermally reflective.

6. A reflector lamp as described in claim 5 wherein said metal is stainless steel having a thickness of approximately 0.002 to 0.004 inches.

7. A reflector lamp as described in claim 1 wherein said tab is crimped.

8. A reflector lamp as described in claim 1 wherein said tab is radially slotted such that a plurality of fingers are formed in said tab.

9. A reflector lamp as described in claim 1 wherein said light-source capsule is a tungsten-halogen capsule.

10. A reflector lamp as described in claim 1 wherein the shape of said reflector is substantially a paraboloid.

11. A reflector lamp as described in claim 1 wherein said lamp has an Edison-type base mounted on said neck and said light-source capsule and said base are electrically coupled via lead-in wires passing through said neck.

12. A reflector lamp as described in claim 1 wherein a temperature-sensitive component is located within said neck on the side of said multifunctional member opposite to that of said light-source capsule.

13. A reflector lamp as described in claim 12 wherein said temperature-sensitive component is a diode.

14. A reflector lamp comprising:
   (a) an outer envelope enclosing an interior, said outer envelope including a reflector and light-transmissive lens, said reflector having an aperture therein, said outer envelope including a neck joining said reflector about the perimeter of said aperture;
   (b) a light-source capsule positioned within said aperture and optically aligned with said reflector;
   (c) a multifunctional member mounted on said neck within said outer envelope, said member providing means for supporting said light-source capsule, means for optically aligning said light-source capsule with respect to said reflector, means for reflecting infrared energy away from said neck, means for blocking convective heat transfer to said neck, and means for reflecting light incident on said member toward said lens, said multifunctional member having a substantially paraboloidal-shaped body with a flexible annular tab extending downward and outward conically from the periphery of said body, the focal center of said paraboloidal-shaped body being substantially coincident with the focal center of said reflector, the curvature of said paraboloidal-shaped body being matched with the curvature of said reflector; and
   (d) means passing through said neck for providing electrical power to said light-source capsule.

15. A multifunctional member for a reflector lamp, said lamp having an outer envelope enclosing an interior, said outer envelope including a reflector and light-transmissive lens, said reflector having an aperture therein, said outer envelope including a neck joining said reflector about the perimeter of said aperture, said lamp further including a light-source capsule mounted on said multifunctional member, positioned within said aperture, and optically aligned with said reflector, said multifunctional member comprising:
   (a) means for supporting said light-source capsule;
   (b) means for optically aligning said light-source capsule with respect to said reflector;
   (c) means for reflecting infrared energy away from said neck;
   (d) means for blocking convective heat transfer to said neck;
   (e) means for reflecting light incident on said multifunctional member toward said lens; and
   (f) said multifunctional member having a substantially paraboloidal-shaped body with a flexible annular tab extending downward and outward conically from the periphery of said body, the focal center of said paraboloidal-shaped body being substantially coincident with the focal center of said reflector when said multifunctional member and reflector are operationally positioned, the curvature of said paraboloidal-shaped body being matched with the curvature of said reflector.

16. A multifunctional member as described in claim 15 wherein said annular tab has a tapered thickness being thinnest at the outer edge of said tab.

17. A multifunctional member as described in claim 15 wherein said light-source capsule has a press seal at an end thereof and said multifunctional member has a slot formed therein for receiving and securely mounting said light-source capsule on said member.

18. A multifunctional member as described in claim 17 wherein said slot has second tab means associated therewith for engaging said press seal of said light-source capsule.

19. A multifunctional member as described in claim 15 wherein said multifunctional member is formed from metal and the surface of said member facing the interior of said reflector is optically and thermally reflective.

20. A multifunctional member as described in claim 19 wherein said metal is stainless steel having a thickness of approximately 0.002 to 0.004 inches.

21. A multifunctional member as described in claim 15 wherein said tab is crimped.

22. A multifunctional member as described in claim 5 wherein said tab is radially slotted such that a plurality of fingers are formed in said tab.

* * * * *

UNITED STATES PATENT AND TRADEMARK OFFICE
CERTIFICATE OF CORRECTION

PATENT NO. : 4,829,210
DATED : May 9, 1989
INVENTOR(S) : Benson et al.

It is certified that error appears in the above—identified patent and that said Letters Patent is hereby corrected as shown below:

In Claim 1: Column 8, line 36, please replace "toward" with --outward--.

Signed and Sealed this

Tenth Day of October, 1989

*Attest:*

DONALD J. QUIGG

*Attesting Officer*   *Commissioner of Patents and Trademarks*